April 1, 1952 H. P. DEITZ 2,591,340
TIRE PRESSURE EQUALIZERS
Filed March 21, 1950 2 SHEETS—SHEET 1
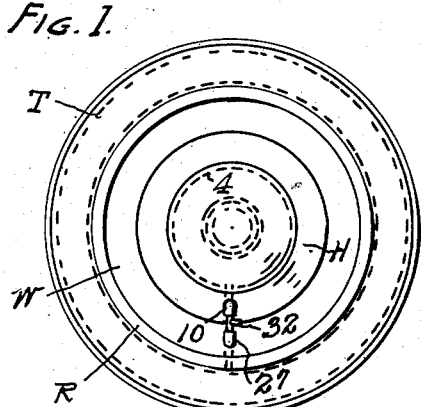
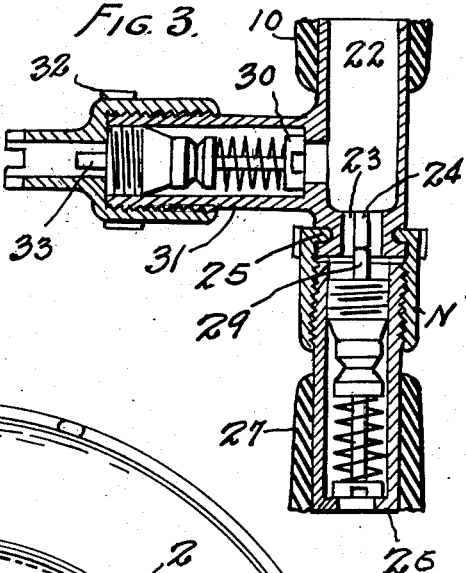
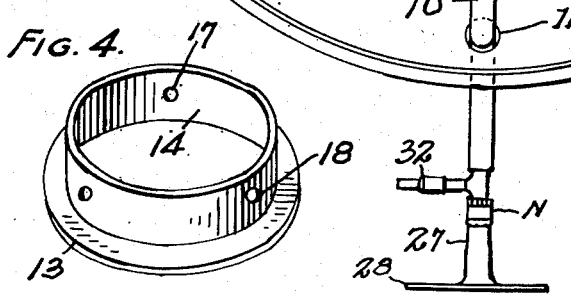
INVENTOR.
HENRY P. DEITZ
BY
Charles K. Davies & Son
Attys.

April 1, 1952     H. P. DEITZ     2,591,340
TIRE PRESSURE EQUALIZERS
Filed March 21, 1950     2 SHEETS—SHEET 2
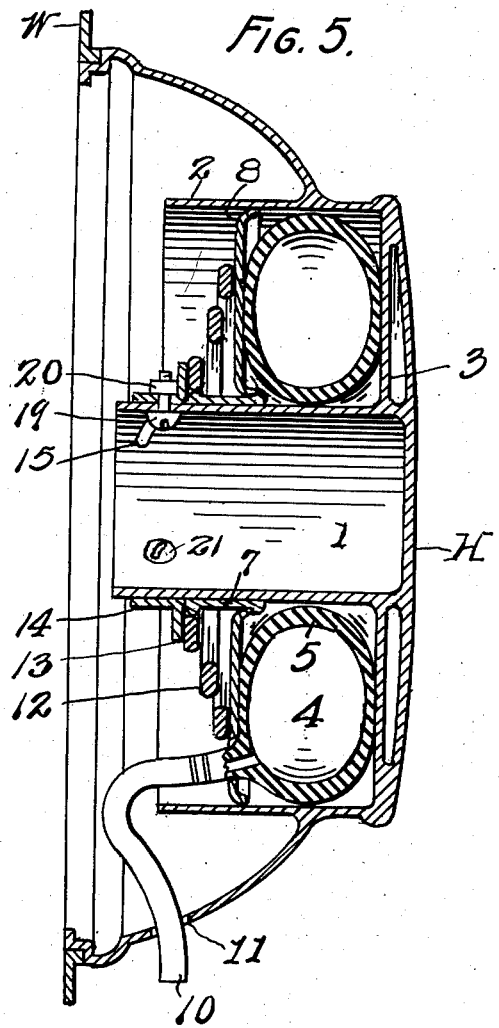
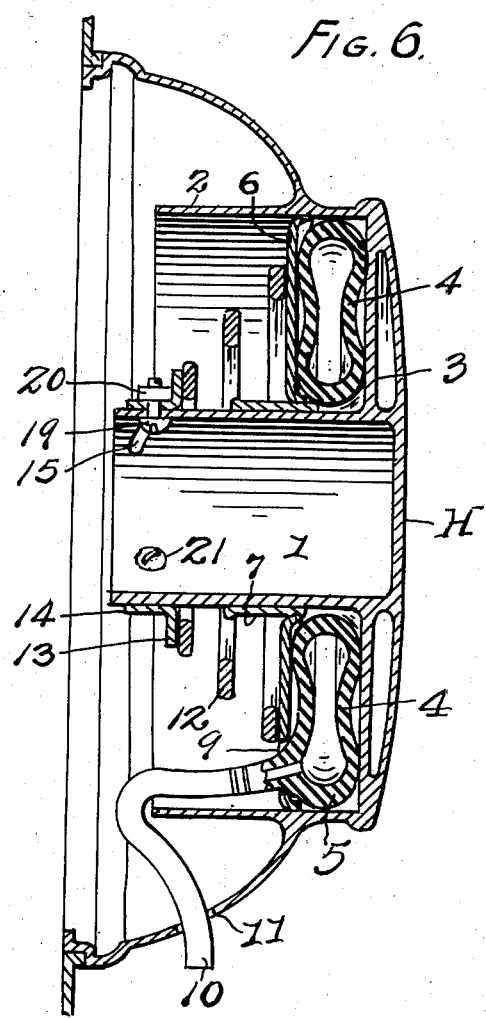
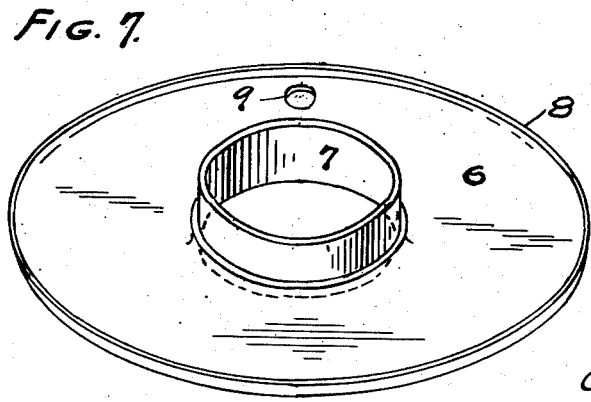
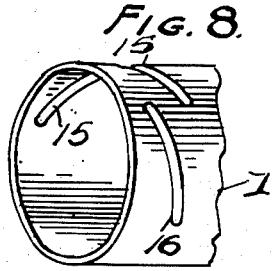
INVENTOR.
HENRY P. DEITZ
BY
Charles K. Davies & Son
Attys.

Patented Apr. 1, 1952

2,591,340

UNITED STATES PATENT OFFICE 2,591,340

TIRE PRESSURE EQUALIZER

Henry P. Deitz, West Hyattsville, Md.

Application March 21, 1950, Serial No. 150,941

7 Claims. (Cl. 152—418)

My present invention relates to the general class of inflating devices for the pneumatic tires of automotive vehicle wheels having wheel-carried means for auxiliary use and in the nature of an improved tire pressure equalizer or automatic stabilizer, which while adapted for various purposes and uses is especially designed for use with standard air-pressure tires to maintain a predetermined and even pressure in a tire.

The pressure equalizing mechanism or appliance includes an auxiliary air reservoir mounted within the hub-cap of a wheel, together with an air-connection between the tire and the reservoir and a valve arrangement for automatically relieving excess air pressure in the tire, and for restoring the predetermined normal pressure to the tire. Thus when the pressure of air in the tire attains an excessive degree due, for instance, to temperature changes occasioned by high speeds of a travelling automotive vehicle, or to an unusually heavy load on the vehicle, the excess pressure created within the tire is automatically transferred to the expansible and deflatable reservoir. Means are provided in combination with the auxiliary reservoir for automatically restoring and returning the excess pressure from the reservoir to the tire after the heated air and tire have cooled to normal condition.

The equalizing or stabilizing appliance may be manufactured with facility and low cost of production and embodied in standard types of hub-caps without necessity for material alteration in the construction of the wheel and tire, and each of the wheels of an automotive vehicle may be equipped with the appliance of my invention with a minimum expenditure of time and labor, to insure a reliable and efficient appliance for the performance of its functions.

The invention consists in certain novel features of construction and combinations and arrangements of parts as will hereinafter be described and more particularly set forth in the appended claims.

In the accompanying drawings I have illustrated a complete example of a physical embodiment of my invention wherein the parts are combined and arranged in accord with one mode I have devised for the practical application of the principles of the invention. It will however be understood that changes and alterations are contemplated and may be made in these exemplifying drawings and mechanical structures, within the scope of my claims, without departing from the principles of the invention.

Figure 1 is a view in side elevation showing a typical disk wheel and its pneumatic tire equipped with the appliance of my invention.

Figure 2 is an enlarged elevation or inner face view of the hub-cap with the auxiliary reservoir-assembly installed therein.

Figure 3 is a further enlarged detail sectional view of the filling valve and relief valve, together with a disconnector or coupling, located between the tire and the reservoir.

Figure 4 is a perspective view of a tension adjusting sleeve or gauge-collar for use with the expansible auxiliary reservoir.

Figure 5 is a vertical sectional view of the hub cap with the reservoir inflated or expanded by excess air pressure; and Figure 6 is a similar view with the reservoir resiliently compressed or deflated.

Figure 7 is a perspective view of the presser-plate or disk for the air reservoir; and its loose slip-sleeve.

Figure 8 is a fragmentary perspective view of the bearing barrel showing its tension adjusting slots.

In order that the general relation of parts may readily be understood I have shown in Fig. 1 a conventional disk wheel W with its low-pressure tire T and rim R, and the hub-cap H is rigidly attached to and readily detached from the web of the wheel in usual manner.

In applying my invention to the wheel the hub-cap is equipped with an interior, preferably welded frame-work including an inner central horizontal and cylindrical sheet metal tube or barrel 1 and a concentric housing or drum 2 having an annular base-plate 3. The base-plate 3 forms an upright brace within the hub cap, and the hub cap H, together with the base plate, form an exterior closed head for the central portion of the wheel. The central barrel 1 and the concentric housing or drum 2, which are open at the inner side of the hub cap, provide an inner annular chamber for the enclosed expansible and deflatable air reservoir 4.

The auxiliary reservoir, of rubber or other suitable material is of annular shape to surround the barrel and fit within the annular wall of the housing with one side bearing against the base-plate, and in cross section the reservoir may be of desired shape and preferably fashioned with thickened walls as 5, 5, to provide wear faces for contact with the confining walls of the housing, and the exterior surface of the barrel.

The air reservoir is automatically deflated or compressed against the base plate by resilient means including an open center disk or presser plate 6 having an inner slip-sleeve 7 for sliding contact with the central barrel, and an outer annular flange 8 for frictional guidance against the inner face of the annular wall 2 of the housing. For convenience in making the air-connection between the reservoir and the tire the presser plate is cut out at 9 to accommodate an air-hose section 10 that opens through a port into the reservoir, and the hose section is extended from the interior of the hub cap through an aperture 11 to the exterior of the hub cap.

For deflating or compressing the reservoir against normal air pressure in the tire, and for returning or restoring excess pressure released from the tire, a coiled spiral spring 12, which is flattened or oblong in cross section and collapsible as shown is mounted about the barrel with its larger end bearing against the face of the presser plate, and its smaller end, which surrounds the barrel, bears on an annular flange 13 of a tension-adjusting collar 14 that is rotatably mounted and longitudinally slidable on the exterior surface of the barrel.

For coaction with this collar in adjusting the tension of the spring with relation to the normal air pressure in the tire, and as best seen in Fig. 8, the wall of the barrel is cut out to form two arcuate spirally extending slots 15 and 16; and in Fig. 4 the collar 14 is drilled with two spaced bolt holes 17 and 18.

Two screw bolts 19, 19, are passed through the registering slots and bolt holes, and the bolts are threaded into anchoring nuts 20 that are preferably square to fit against the flange 13 and prevent displacement from the bolts. After the adjusting collar has been turned and moved longitudinally on the barrel, as by means of a suitable tool or wrench, a third screw bolt or set screw 21 may be threaded through the barrel and against the collar to lock the latter in adjusted position.

In order to provide a detachable air connection between the tire and the reservoir, the outer end of the hose section 10 has mounted therein an angular metal fixture that includes a radially extending tube or bushing 22 having a port 23 and an integral, centrally arranged stop or presser pin 24. This ported portion or head of the bushing has an exterior annular groove, and a non-traveling rotatable nut N or disconnector, having an inner annular flange 25 mounted on the grooved head. The nut provides a detachable connection for a relief valve-casing 26 which is affixed within the end of a hose section 27 that is affixed, as usual at 28 (Fig. 2) in the tire T of the wheel.

The casing 26 contains a typical tire valve having a usual valve stem 29 that is alined with the stop or presser pin 24, and in Fig. 3 it will be seen that the nut or connector N has been turned to draw the casing 26 toward the bushing 22 and to push the valve stem 29 against the stop pin 24, thereby opening the relief valve for air communication between the bushing and the casing, and so to the reservoir and the tire.

For filling the tire with air under a predetermined pressure, a typical spring pressed and closed tire-filling valve 30 is mounted in its casing 31 that projects laterally from the bushing 22 into which it opens, and the usual dust cap 32 is threaded on the casing to protect the stem 33 of this valve.

The tension of spring 12 has previously been adjusted to compress or deflate the reservoir and hold it compressed against the normal pressure being built up in the tire through the two valves; but when the pressure in the tire increases above the normal predetermined degree, this excess pressure passes through the open relief valve and into the reservoir, overcoming the adjusted tension of the spring and relieving the tire, and as the filling valve is closed outwardly the excess pressure is confined to the reservoir and the air connection.

When it becomes necessary to detach or remove the hub-cap from the wheel, the non-traveling nut or disconnector N is turned until the valve casing 26 is released therefrom, and this movement withdraws the stem 29 from stop pin 24 thereby permitting the relief valve to close and maintain the pressure in the tire, after which operation the hub-cap may be removed in usual manner.

While one hub cap is illustrated herein, it will of course be understood that the hub-caps of the wheels of automotive vehicles are each equipped with the equalizers, and the capacity of the air reservoir will be determined by the size of the wheel and its pneumatic tire. By the use of the air reservoir in the hub-cap to receive excess pressure from the tire, the danger of blow-outs from the tire is eliminated, and when an overheated tire cools, the reservoir is compressed by the spring to return and restore the normal pressure in the tire.

Having thus fully described my invention, what I claim as new and desire to secure by Letters Patent is:

1. In a pressure equalizer for a vehicle wheel having a pneumatic tire and a hub cap forming a closed head, the combination with an annular air reservoir of elastic material mounted in the hub cap with one side bearing against said head, and resilient means bearing against the opposite side of the reservoir for deflating the reservoir, of a flexible and detachable air-connection between the tire and the reservoir including a manually operated disconnector, said connection including a resiliently closed relief valve and means actuated by the disconnector for opening said valve, and a resiliently closed tire-filling valve communicating with the connection between the reservoir and the relief valve.

2. In a pressure equalizer for a wheel having a pneumatic tire, a detachable hub cap forming a closed head, an annular air reservoir of elastic material mounted in the hub cap with one side bearing against said head, and resilient means bearing against the opposite side of the reservoir for deflating the reservoir in the absence of excess air pressure, the combination with spaced hose-sections open to the tire and reservoir respectively, of a bushing affixed to the reservoir-section and a resiliently closed tire-filling valve connected with the bushing, a relief valve and its casing affixed in the tire-section, a disconnector detachably coupling the casing with the bushing, and means coacting with the disconnector for opening the relief valve.

3. In a pressure equalizer for a wheel having a pneumatic tire, a detachable hub cap forming a closed head, an expansible excess-air reservoir of elastic material mounted in the hub cap with one side bearing against said head, and resilient means bearing against the opposite side of the reservoir for deflating the reservoir in the absence of excess air-pressure, the combination with spaced hose-sections open to the tire and the reservoir respectively, of a valve casing mounted in the tire-section and a resiliently closed relief valve in the casing, a hollow head mounted in the reservoir-section and a resiliently closed tire-filling valve communicating with the head, a rotatable non-traveling nut mounted on the head and threaded on the valve casing, and means coacting with the nut for opening the relief valve.

4. In a pressure equalizer for a wheel having a hub cap forming a closed head, a pneumatic tire, an expansible excess-air reservoir of elastic material mounted in the hub cap with one side against said head, and resilient means within the hub cap bearing against the opposite side of the reservoir for deflating the reservoir in the absence of excess air pressure, the combination with spaced hose-sections open to the tire and to the reservoir respectively, of a hollow head fixed to the reservoir section and a resiliently closed tire-filling valve open to the hollow head, a disconnector rotatably mounted on the hollow head, a valve-casing having a threaded connection with the disconnector, a resiliently closed relief valve in said casing, and a stop pin rigid with the disconnector in the path of and adapted to open the relief valve.

5. In a pressure equalizer for a wheel having a hub cap forming a closed head, a pneumatic tire, an annular excess-air reservoir of elastic material mounted in the hub cap with one side bearing against said head and resilient means within the hub cap bearing against the opposite side of the reservoir for deflating the reservoir in the absence of excess air pressure, a flexible and detachable air-connection between the tire and the reservoir including a disconnector, a relief valve in the connection activated by the disconnector for opening the relief valve, and a resiliently closed tire-filling valve open to the connection and located between the relief valve and the reservoir.

6. In a tire-pressure equalizer as described, the combination with a hub cap forming a closed head having a cylindrical housing and a central barrel rigid with the housing having spaced spiral slots, an annular excess-air reservoir of elastic material located in the housing and bearing at one side against said head, and an annular presser plate for the reservoir surrounding the barrel and bearing against the opposite side of the reservoir, of a rotary and longitudinally movable adjusting collar mounted on the exterior of the barrel and screw-bolts coacting with the collar and the slots of the barrel, and a spirally coiled spring interposed between the presser plate and the adjusting collar.

7. In the tire-pressure equalizer described, the combination with a hub cap forming a closed head having an interior cylindrical housing and a central barrel within the housing, and an annular excess-air reservoir of elastic material located within the housing and bearing at one side against said head, of a slip-sleeve slidable on the exterior of the barrel, an annular presser-plate loosely mounted on the slip-sleeve for coaction with an opposite side of the reservoir, an exterior guide flange on the presser-plate for coaction with the housing, an adjustable collar mounted on the barrel and means for retaining the collar in adjusted position, and a spiral tension spring interposed between the collar and the presser-plate.

HENRY P. DEITZ.

REFERENCES CITED

The following references are of record in the file of this patent:

UNITED STATES PATENTS

| Number | Name | Date |
|---|---|---|
| 1,558,025 | Ludwick | Oct. 20, 1925 |
| 2,439,188 | Sage | Apr. 6, 1948 |